(12) United States Patent
Hansson et al.

(10) Patent No.: US 6,834,037 B2
(45) Date of Patent: Dec. 21, 2004

(54) METHOD AND ARRANGEMENT IN A TELECOMMUNICATION SYSTEM

(75) Inventors: Göran Hansson, Årsta (SE); Lars Marklund, Stockholm (SE); Bengt Engman, Stockholm (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 866 days.

(21) Appl. No.: 09/801,776

(22) Filed: Mar. 9, 2001

(65) Prior Publication Data

US 2001/0021170 A1 Sep. 13, 2001

(30) Foreign Application Priority Data

Mar. 10, 2000 (SE) .............................................. 0000806

(51) Int. Cl.⁷ ........................... G01R 31/08; H04L 12/28
(52) U.S. Cl. ................................... 370/216; 370/395.5
(58) Field of Search ............................... 370/216, 225, 370/227, 228, 237, 238, 242, 248, 351, 386, 469, 395.5

(56) References Cited

U.S. PATENT DOCUMENTS 5,398,236 A * 3/1995 Hemmady et al. .......... 370/218
5,828,844 A 10/1998 Civanlar et al.
5,959,972 A * 9/1999 Hamami ..................... 370/228

FOREIGN PATENT DOCUMENTS

| EP | 0926859 | 6/1999 |
| WO | WO98/54923 | 12/1998 |
| WO | WO99/37063 | 7/1999 |

* cited by examiner

Primary Examiner—Wellington Chin
Assistant Examiner—Brenda Pham

(57) ABSTRACT

The method and arrangement according to the present invention relate to communication networks using ATM-(Asynchronous Transfer Mode) connections for data transmission, particularly ATM-connections adapted for transmission of, e.g., IP-packets. Transmission of IP-packets via an IP-link in an ATM-based communication network is done by a link function block that is implemented between IP-level and ATM-level. The function block includes selector for selecting an operative ATM-connection, which is assigned to said IP-link, monitor for monitoring the operability of selected ATM-connections and re-selector for reselecting a redundant ATM-connection if one of the assigned connections is detected to be inoperative.

13 Claims, 5 Drawing Sheets

METHOD AND ARRANGEMENT IN A TELECOMMUNICATION SYSTEM

FIELD OF THE INVENTION

The present invention relates to communication networks using i.a. ATM-(Asynchronous Transfer Mode) connections for data transmission, particularly ATM-connections adapted for transmission of, e.g., IP-packets.

BACKGROUND OF THE INVENTION

The ATM (Asynchronous Transfer Mode)-technology has received a lot of attention as a major transport technology. ATM intends to combine the advantages of the basic switching technologies circuit-switching and packet-switching. Circuit-switched networks, on the one hand, are rather simple while being capable to provide high bit rates and guaranteed small delay times. Packet-switched networks, on the other hand, provide the greater flexibility and, above all, efficient multiplexing facilities. Thus, ATM-based communication networks can be characterised as high-speed switching systems offering large bit pipes, allowing statistical multiplexing while reducing the overall bandwidth requirements. The fundamental strategy behind ATM is to split information that is to be transmitted into small units, so called cells, with a fixed cell size of 53 bytes divided into a 5 byte header portion and a 48 byte payload field. FIG. 1 presents the ATM reference model for a brief description of data transmission in ATM-networks. Said model consists of four protocol levels: The lowest level is the physical level 11. As ATM is designed to be independent of a specific transmission medium it is possible to use wired or wireless connections or even package the ATM-cells inside the payload of other carrier systems. Objects of the ATM-layer 12 are, i.a., to build ATM-cells and to establish and release virtual connections that are intended to transport said cells. On top of said ATM-layer 12, an ATM adaptation layer (AAL) has been defined as a kind of interface towards protocols that do not operate on a cell basis. Said adaptation layer is divided into two sublayers: The Convergence Sublayer 13b contains an application specific subpart and a common part that is responsible, e.g., to break down data streams or frames messages into smaller units of 44 to 48 bytes and vice versa. The Segmentation Reassembly Sublayer 13a is mainly used to forward and receive cell payloads to and from the ATM-layer 12. There have been defined several alternative variants of AAL, because said adaptation layer is intended to adapt the ATM-protocol to protocols of the application layer 15 that require various service requirements and use various traffic classes, e.g. with respect to delay conditions, bit rates, and the kind of connection that shall be applied. The present invention mainly focuses on AAL5.

Yet another protocol structure is represented by the TCP/IP reference model as shown in FIG. 2. Said model refers to a packet-switched network that applies on the network layer 22 the Internet protocol (IP), which provides a connectionless, unreliable communication between two arbitrary hosts in an internet consisting of a plurality of interconnected subnetworks. On the transport layer 23 either TCP or UDP is implemented for providing a reliable or unreliable communication service, respectively, to the upper layer protocols that are used on the application layer 24. With respect to the lowest layer 21, the IP-protocol does not—and shall not—rely on a specific communication protocol, e.g. between two adjacent hosts, as it must be able to forward IP-packets throughout a plurality of interconnected networks using a variety of different data link layer protocols. Thus, it is possible to apply, e.g., the ATM-protocol structure as described above as a kind of underlying transport protocol for IP-packets in the meaning of the TCP/IP reference model.

Third generation communication systems, e.g. the Universal Mobile Telecommunication System (UMTS) as defined by the European Telecommunications Standards Institute (ETSI) have been developed with regard to certain key factors, e.g. multimedia capability or bandwidth on demand, in order to provide a wide and flexible range of services to their user equipments. UMTS supports a modularly architecture concept consisting of two major parts: The UMTS core network is responsible for providing telecommunication services, i.a. call and subscriber data management, and for providing access to other communication networks, e.g. PSTN or Internet. The UMTS Radio Access Network is mainly responsible for managing the radio functionality for connections between core network and the user equipments. This UMTS Terrestrial Radio Access Network (UTRAN) consists of at least one Radio Network Controller (RNC) and a plurality of Radio Base Stations (RBS). Transport of user data and control signalling data between said Radio Network Controllers and/or the various Radio Base Station nodes is done by means of connections using an ATM-based protocol structure. Additionally, a management system must be implemented and capable to access the network nodes, e.g. via an Ethernet connection to at least one node in the Radio Access Network. Examples of management activities are configuration of network nodes, remote downloading of software, and performance measurements. These management systems often use protocols based on the Internet Protocol (IP), e.g. File Transfer Protocol (FTP), Hypertext Transfer Protocol (HTTP), Telnet, or Simple Network Management Protocol (SNMP), and can be located either centrally in a Radio Access Network Operations System (RANOS) in the UMTS Radio Access network or in a thin client terminal that is connected locally to a Radio Network Controller or a Radio Base Station. Also the Network Time Protocol, which is used for synchronisation of the real-time clocks in UTRAN nodes, is based on the Internet Protocol. Therefore, an IP-network is to be built between the network nodes and the management system by using the ATM infrastructure of the UMTS Radio Access Network. Accordingly, the present invention intends to solve the problem of an interworking between management system and Radio Access Network that is done such that IP-based management messages can be transmitted via the ATM-based access network and such that the management communication with a node shall be maintained as long as there exist a physical link that can carry ATM-connections to this node.

The topology of an IP-based management network in the UMTS Radio Access Network can be modelled as a plurality of nodes with an implemented IP-functionality that are interconnected by means of ATM-based point-to-point connections to other nodes and that are accessible for a management system. The management system can thus access the management functions in said nodes by means of the IP-addresses that are assigned to these nodes. As each such IP-node comprises a routing functionality, IP-packets can be forwarded to a destination node (RNC or RBS) via several intermediate nodes by using said ATM-based point-to-point connections and/or via, e.g., Ethernet between said nodes and the management system. One known solution for transportation of IP-packets over ATM-based point-to-point connections is the usage of the ATM Adaptation Layer 5 (AAL5) protocol and encapsulation of IP-packets as specified in the Request for Comment (RFC) 2225 ("Classical IP and ARP over ATM"). Nodes in the UMTS Radio Access Network are always interconnected by at least two physical links with ATM-capability and the IP-protocol uses ATM as an underlying packet transport protocol. For transport of IP-packets, these ATM-connections are designed as Permanent Virtual Channel (PVC-) connections that are either pre-configured for said nodes or established by the management system. Each of these point-to-point connections is modelled as an IP-subnetwork with one IP-address defined for each end of the link. Routing of IP-packets in an IP-node is done on the IP-level by means of selecting an appropriate IP-subnetwork, i.e. selecting one of the available ATM-connections to a subsequent node, and applying said selected subnetwork address as the forwarding address by the routing procedure.

SUMMARY OF THE INVENTION

The solution as described above implies certain limitations: The number of nodes, e.g., in an UMTS Radio Access Network, and thus the number of ATM-connections, might become considerably large. The number of IP-subnetworks for each of said ATM-connections will increase accordingly. Therefore, it becomes apparent that a growing network implies an increasing number of IP-subnetworks that must be administered. It is another limitation of said solution that an ATM-connection that becomes inoperative causes that the corresponding IP-link, which applies said connection, will also become inoperative. This will be detected by the IP routing protocol in the two affected nodes that were interconnected by said inoperative ATM-connection and is interpreted as a change in the topology of the IP-network.

The measure taken will then be that said change is announced to the other nodes in the network and the routing protocol in each node must recalculate its routing table in order to circumvent the IP-subnetwork with the inoperative connection by reselecting a redundant IP-subnetwork between the two affected nodes and switching over data traffic to said IP-subnetwork. This causes an additional network load due to the fact that the topology change must be distributed to the nodes of at least parts of the network. Also, the switch over to the redundant IP-subnetwork cannot take place immediately since the nodes will have to recalculate their routing tables.

In general terms, the present invention relates to a plurality of interconnected nodes, at least parts of which forming a first communication network applying a first communication protocol and at least parts of which forming a second communication network applying a second, e.g. packet-based, communication protocol, whereby said second communication protocol uses said first communication protocol as an underlying data transport protocol.

It is a first object of the present invention to achieve a second communication network consisting of a number of subnetworks, and thus assigned addresses, that is reduced in such a way that the reliability of said subnetworks is enhanced.

It is another object of the present invention to achieve a second communication network that allows data transfer via links between nodes, said links consisting of several point-to-point connections, such that the management of said links according to the second communication protocol is independent of the management of said point-to-point connections according to the first communication protocol.

It is still another object of the present invention to achieve a communication network having a reduced amount of network administration traffic due to topology changes in the second communication network, which are caused by topology changes, e.g. due to connection failures, in the first communication network.

It is a particular object of the present invention to achieve a network node using IP as the first communication protocol and using ATM as the second communication protocols, said node comprising a function block that allows transmission and reception of IP-packets via one single access point and that can access one or more ATM-connections for transmission or reception of IP-packets.

It is yet another object of the present invention to achieve a method for efficient transmission and routing of IP-packets in an ATM-based communication network.

Briefly, these and other objects of the present invention are accomplished by the method and arrangement according to the present invention comprising a link function block that is implemented in a number of nodes in a communication network including means for selecting an operative point-to-point connection, e.g. an ATM-connections, that is applied as part of a link for data transmission and/or reception, e.g. by means of IP-packets, between two arbitrary nodes. Said function block also includes means for monitoring the operability of assigned point-to-point connections and means for reselecting a redundant connection if one of said selected connections is detected to be inoperative.

As a first advantage, the present invention allows a plurality of nodes to be interconnected by a reduced number of subnetworks.

It is thus an advantage of the present invention that network addressing and administration can be done in a more efficient way even for an increasing number of network nodes.

It is another advantage that an end-to-end protocol will experience only infrequent changes in the network topology due to an enhanced reliability of the subnetworks.

It is thus another advantage of the present invention that less network administration information need to be broadcasted between the nodes in the communication network.

It is still an advantage of the present invention that routing in the network can be performed in a more efficient way. Said efficiency implies shorter time delays due to the reduced number of subnetworks and due to infrequent changes in the network topology and less network load due to a reduced broadcast of network administration information.

It is in particular an advantage of the present invention that transmission and routing of IP-packets over ATM-connections is done in a more efficient and reliable way.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

DETAILED DESCRIPTION

The following detailed description refers in particular to the usage of the method and arrangement according to the present invention for transmission of IP-packets in an ATM-based UMTS Radio Access Network. However, as explained later on, said invention can also be applied for other network topologies and protocol types.

Figure 3:
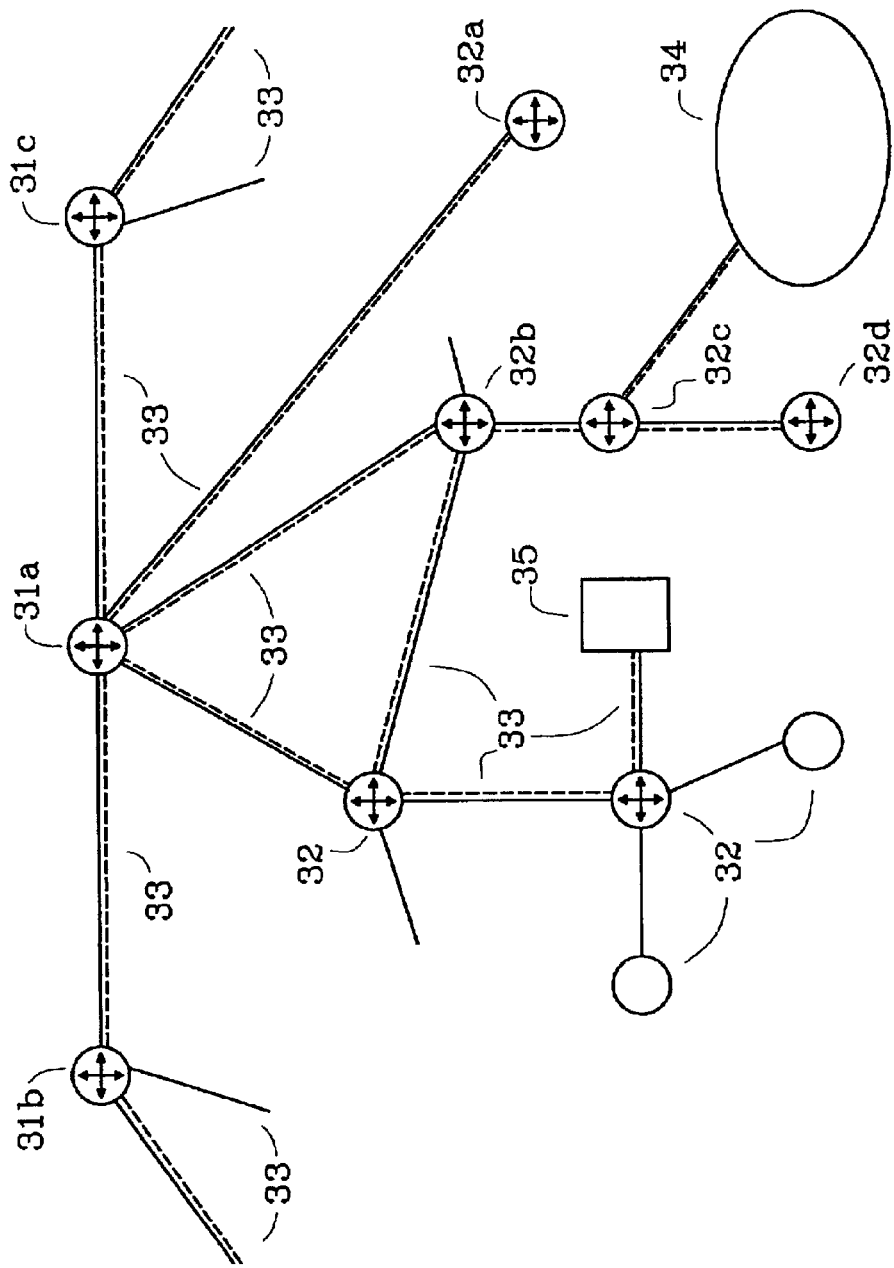
FIG. 3 shows a communication network comprising network nodes that apply a second and, partly, a first communication protocol.

FIG. 3 shows a part of a communication network 30 that is object of the present invention. Said network 30 consists of a plurality of nodes 31, 32 that can be connected to one or more other node by means of appropriate physical connections 33. Here, with regard to UMTS Radio Access Network as an example, said network 30 has been designed as a couple of star-formed subnetworks that are interconnected by central nodes 31a–31c in each subnetwork. Each of said plurality of nodes 32 is connected to one of the central nodes 31a–31c either directly, e.g. node 32a, or as part of a cascaded group of nodes, e.g. nodes 32b–d. Additional connections between certain nodes may be established if necessary. It is also possible to connect other types of networks, e.g. a private operator-owned network 34, or other kind of equipment, e.g. a network operation system 35, to said network 30. In an UMTS Radio Access Network, said central nodes 31a–31c correspond to the Radio Network Controllers (RNC) while the other nodes 32 correspond to the Radio Base Stations (RBS).

Figure 1:
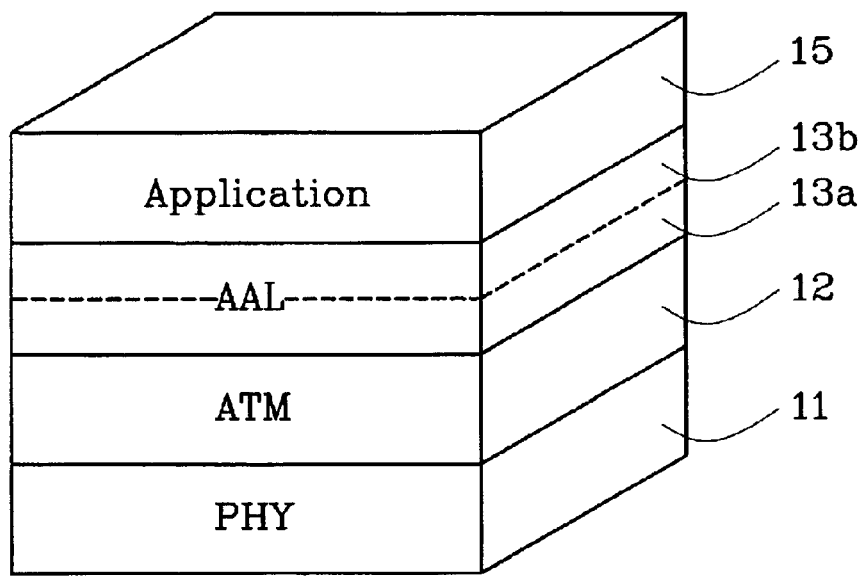
FIG. 1 shows the layered structure of the ATM reference model.
Figure 2:
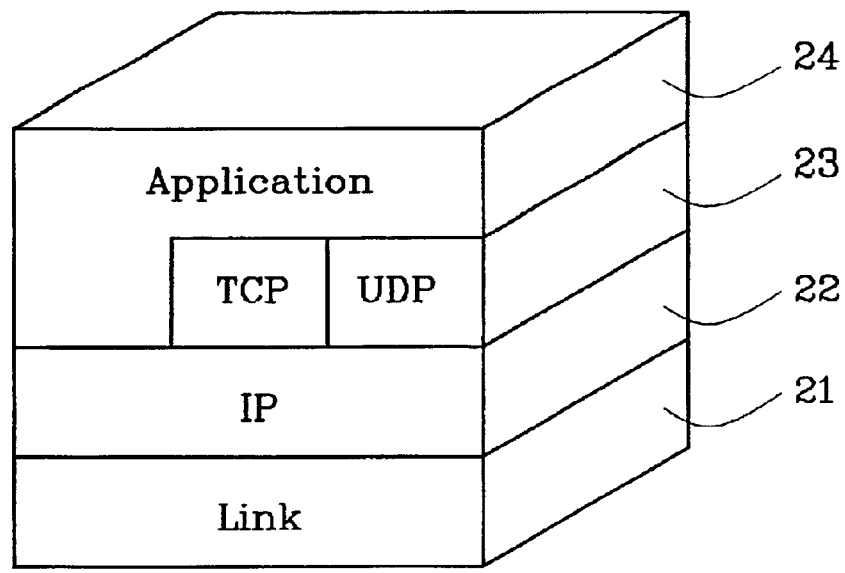
FIG. 2 shows the layered structure of the IP reference model.

The network 30 as described above is intended to support communication between said nodes 31, 32 in accordance with the ATM-reference model as presented in FIG. 1. The ATM-based traffic is transmitted via at least two virtual ATM-connections that are defined on the physical connections 33. However, the number of ATM-connections also depends on the amount of traffic that must be transmitted over said connections. In case of a cascaded group of nodes, e.g. nodes 32b–d, it might be necessary to define a larger number of ATM-connections between those nodes that must handle traffic from other nodes in the cascade, i.e. connections between nodes that are located closer to the central node 31a.

In order to be able to execute an IP-based protocol, e.g. FTP or SNMP, at least some of said nodes must be equipped with an IP-functionality and must be interconnected by so called IP-over-ATM-links. These links between IP-nodes are established as ATM Permanent Virtual Connections (PVC). In FIG. 3, IP-nodes are marked with a routing symbol while dashed lines point out the IP-over-ATM-links between these nodes. The IP-based network structure uses parts of said ATM-based communication network. IP-packets are transmitted via said IP-over-ATM-links by using the ATM-connections for data transmission between adjacent nodes. When providing a connection, e.g., to an external IP-based management network 34 of a network operator, it is possible to integrate the ATM-based communication network within said external network.

The solution according to the state-of-the-art focuses mainly on the level of ATM-connections. It is suggested to define for each ATM Permanent Virtual Connection one point-to-point link on the IP-level and, thus, one IP-subnetwork for each of said ATM-connections. The IP-subnetwork is characterised by the IP-addresses of the IP-nodes that terminate said ATM-connection. In contrast to that, according to the present invention it is already sufficient to define on the IP-level one single point-to-point link, and thus one single IP-subnetwork, that includes all ATM Permanent Virtual Connections between two terminating IP-nodes. An IP-subnetwork connecting two IP-nodes consists of at least two ATM-connections that connect said IP-nodes either directly without switching on the ATM-level or via switching on the ATM-level in one or more intermediate ATM-nodes. The assignment of ATM Permanent Virtual Connections in a subnetwork is co-ordinated by the IP-over-ATM-link function according to the present invention.

Figure 4A:
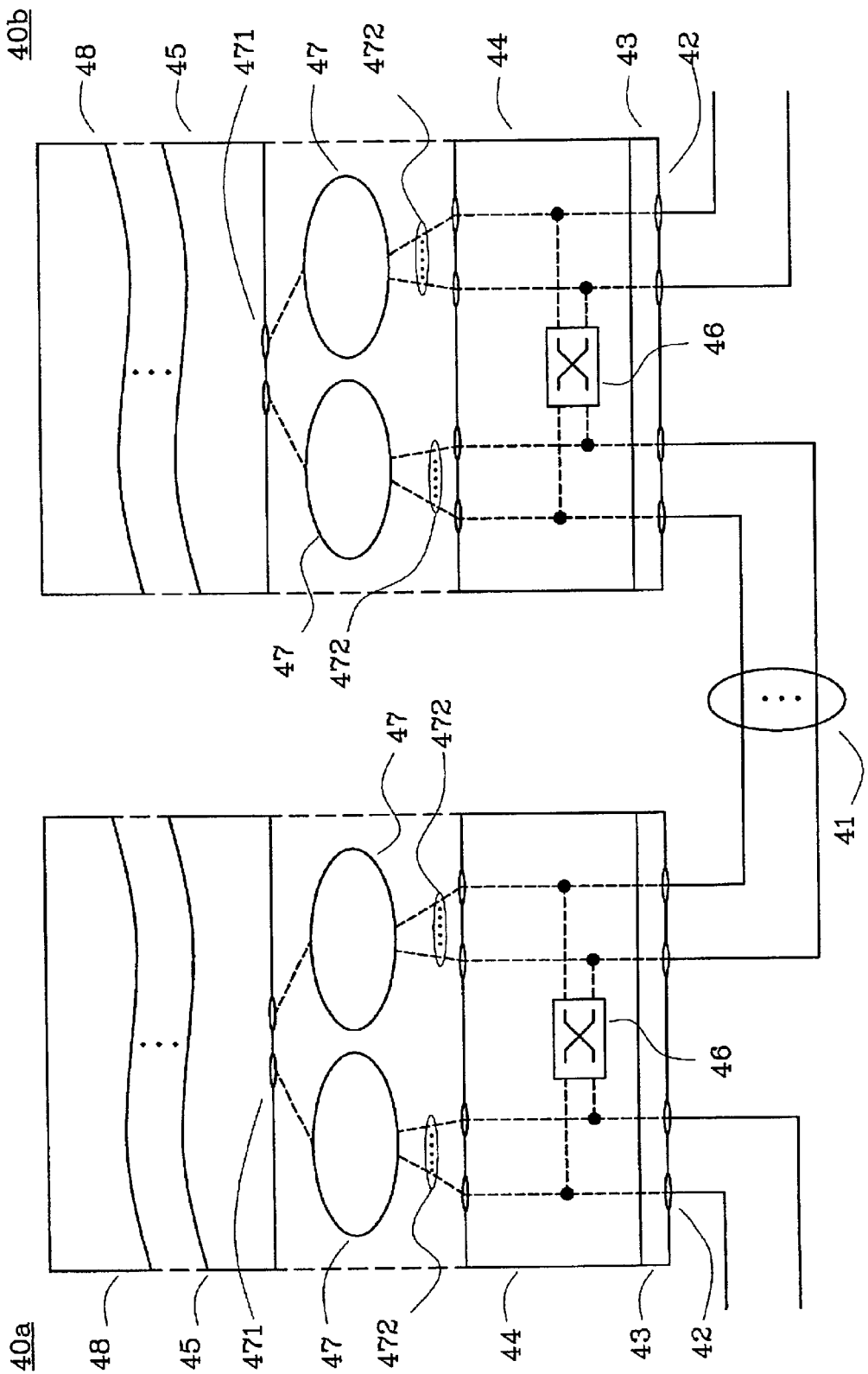
FIG. 4a shows a node as in FIG. 3 supporting two communication protocols and comprising the IP-over-ATM link function according to the present invention.

FIG. 4a shows two nodes 40a,40b corresponding to two IP-nodes 31,32 in the communication network 30 according to FIG. 3 and explains in greater detail the application of the method and arrangement according to the present invention. This figure focuses mainly on presenting the layered protocol structure for two IP-nodes 40a,40b as applied within the scope of this invention. Each IP-node, e.g. 40a, is connected to at least one other IP-node 40b by means of one or more ATM Permanent Virtual Connections 41 on a physical connection. Data is transmitted and received via each ATM-connection by means of physical input ports 42 that are connected to the physical layer 43 of the node. For received data it can be distinguished between data that can be solely processed by the ATM-level 44 or must be processed by the IP-level 45. By help of the present invention, this distinction provides two alternatives for transmission of IP-packets via an intermediate node:

Transmission of IP-packets to an IP-node within another IP-subnetwork must be handled by the IP-level 45. Transmission of IP-packets to a node within the same IP-subnetwork, however, can be solely handled by the ATM-level 44 by means of appropriate switching facilities 46 without any intervention of the IP-level 45. Thus, due to the fact that the IP-over-ATM link function 47 according to the present invention improves the flexibility to create IP-subnetworks, routing can be done in a faster and more efficient way. Transmission of data can be initiated in one of the nodes by a protocol on the application layer 48 that relies on the Internet Protocol (IP). In the UMTS Radio Access Network this could be, e.g., a File Transfer Protocol for downloading software from an operator-owned network to the Radio Network Controller (RNC) and Radio Base Stations in said network.

The central part of the present invention is the IP-over-ATM link function 47 that handles and co-ordinates the data traffic between IP-level 45 and ATM-level 44. As a network node 40a,40b can be connected to several IP-subnetworks there is defined one IP-over-ATM link function 47 for each of these IP-subnetworks. From the point of view of the IP-level 45, an IP-over-ATM link function 47 provides one single access point 471 for reception and transmission of IP-packets via a specific IP-subnetwork. Thus, for transmission of IP-packets to another network node, the IP-level only need to select an appropriate IP-subnetwork by analysing the IP-destination address and to forward said IP-packets to the access point 471 of the corresponding IP-over-ATM link function 47. The further data transmission to the node that is connected via said IP-over-ATM link is then handled solely by said IP-over-ATM link function 47.

Figure 4B:
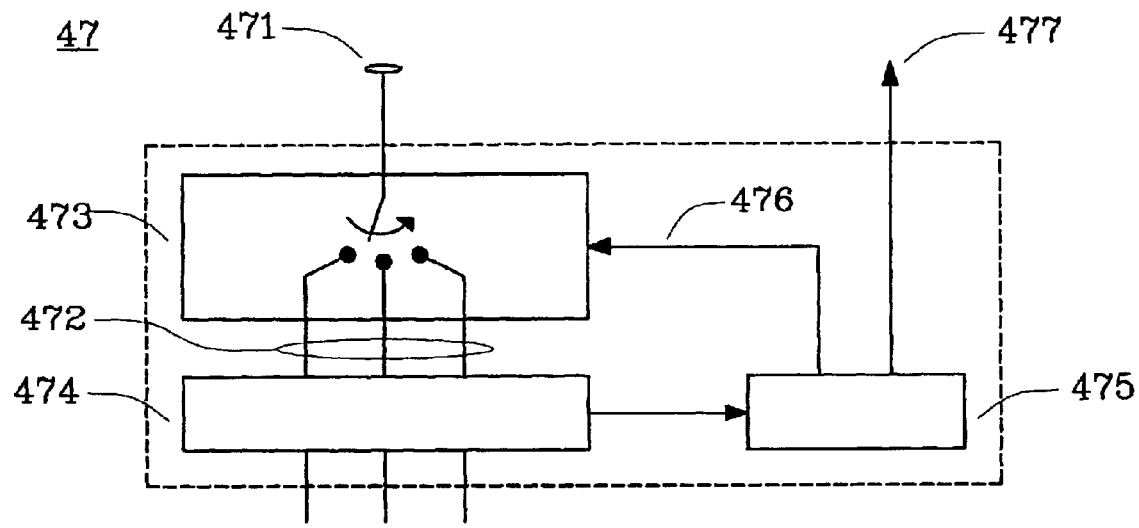
FIG. 4b shows in greater detail the functional sub-blocks of the IP-over-ATM link function according to the present invention.

FIG. 4b shows in greater detail the various functional sub-blocks of the IP-over-ATM link function 47. For an IP-subnetwork said function is responsible for selecting one of the ATM Permanent Virtual Connections 472 that are assigned to an IP-link and that shall be used for transmission of IP-packets through said IP-subnetwork. Accordingly, the link function includes a functional sub-block 473 for selecting such an assigned and operative ATM Permanent Virtual Connections 472. The IP-over-ATM link function 47 is also responsible for constantly monitoring the operative conditions of assigned ATM-connections 472. This is done by a functional sub-block 474 that can monitor and detect failures on said ATM-connections 472, e.g., caused by the physical transmission medium or one of the input ports. The monitoring information is then evaluated by another functional sub-block 475. In case of a detected failure, said sub-block 475 reacts with a first indication signal 476 that initiates a reselection of a redundant ATM Permanent Virtual Connection 472 in the same IP-subnetwork and switch over data transmission to this connection. Apparently, this can be done without any intervention of the IP-level. Therefore, an IP-link that is established via an access points 471 appears to be operative for the IP-level 45 as long as there is at least one assigned and operative ATM Permanent Virtual Connection 472 in the IP-subnetwork that the link function can apply for transmission of IP-packets. However, in case that all ATM-connections are affected by a failure said functional sub-block 475 will react with a second indication signal 477 that indicates that there is no operative ATM-connection available and thus the IP-link is no longer operative. Alternatively, the functional sub-block 476 could send said second indication signal 477 with regard to the operability of the IP-link at periodical times.

The number of IP-subnetworks can be reduced because an IP-subnetwork between two nodes now includes all ATM Permanent Virtual Connections 41 that are established in said IP-subnetwork. From this it becomes apparent that said IP-over-ATM link function allows a network design that is both simplified and flexible: Regarding, e.g., two nodes 40a,40b that are directly connected to each other, it is now sufficient to define one single IP-subnetwork including a plurality of ATM Permanent Virtual Connections 41 between said two nodes instead of defining a plurality of IP-subnetworks between said nodes whereof each one only includes one single ATM Permanent Virtual Connection. Additionally, by help of the present invention it is facilitated to define an IP-subnetwork consisting of two arbitrary nodes and a number of intermediate nodes. Then, the IP-subnetwork contains all ATM Permanent Virtual Connections between the nodes in said IP-subnetwork. Data transmission through intermediate nodes can be done by the ATM-functionality in these nodes.

Figure 5:
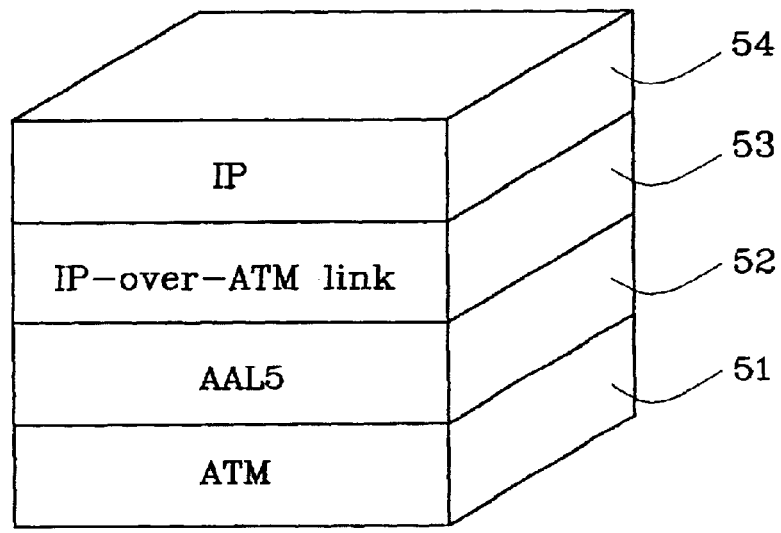
FIG. 5 shows a layered protocol structure including the IP-over-ATM link function according to the present invention.

FIG. 5 shows an model of a layered protocol structure including the IP-over-ATM link function according to the present invention. Data transmission bases on the ATM-protocol 51. The ATM Adaptation Layer 5 (AAL5) protocol 52 is applied as an interface towards higher level protocols. The Internet Protocol (IP) 54 is enabled to transmit and receive IP-packets via the ATM-protocol by means of the intermediate IP-over-ATM link function 53, which is, i.a., responsible for encapsulation of IP-packets into AAL5 data units, and monitoring and selection of ATM/AAL5 connections.

Figure 6:
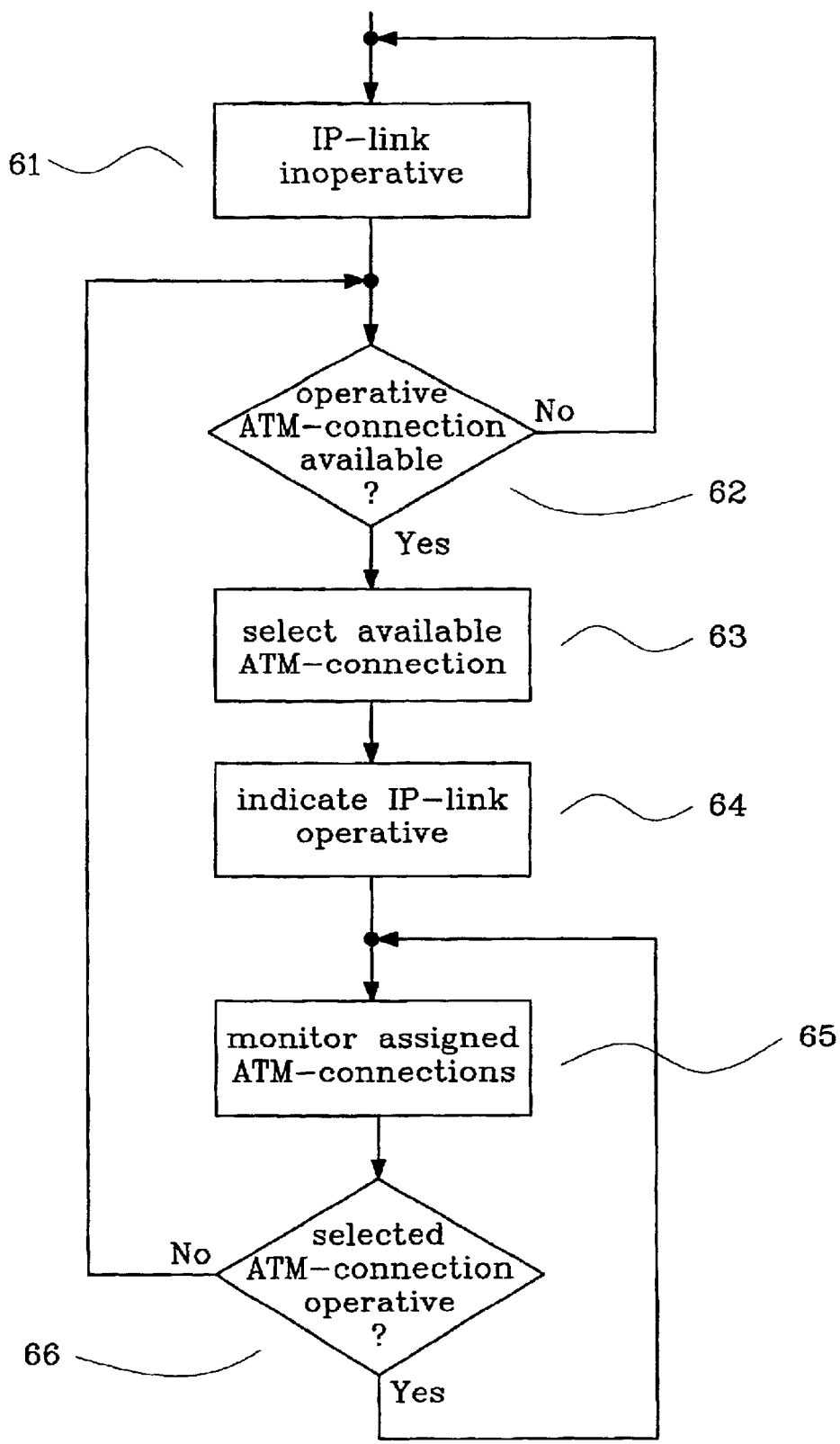
FIG. 6 shows a flowchart comprising the various steps that are performed by said IP-over-ATM link function.

FIG. 6 presents a flowchart showing the various steps of the method according to the present invention that are performed in an IP-over-ATM link function 47 for transmission of IP-packets via an IP-link through a specific IP-subnetwork to an arbitrary destination node in the communication network. In the following, ATM-connections denote ATM Permanent Virtual Connections that have been configured, e.g., by the network operator and that are permanently assigned to a specific IP-link. An IP-link denotes the virtual connection between two arbitrary nodes in a communication network.

Initially, block 61, an IP-link will remain inoperative until its IP-over-ATM link function can provide an operative ATM-connection that has been assigned to said IP-link, block 62 Yes. The IP-over-ATM link function then selects from these ATM-connections, block 63, and indicates that the IP-link is operative, block 64. This implies that the IP-level can transmit IP-packets via said IP-link by using the ATM-connection that has been selected by the IP-over-ATM link function. The operative condition of at least the selected ATM-connections is constantly monitored by the IP-over-ATM link function, block 65, and data transmission via an IP-link will be possible as long as the ATM-connection, which has been selected for said IP-link, works properly, block 66 Yes. If a selected ATM-connection is detected to be inoperative, block 66 No, the IP-over-ATM link function must first check the operational condition of other ATM-connections, block 62, and reselect, if possible, block 62 Yes, a redundant one from these ATM-connections, block 63, for further transmission of IP-packets via said IP-link. This is done by the IP-over-ATM link function without any intervention of the IP-level. However, if there is no redundant ATM-connection available for reselection, block 62 No, the non-availability of this IP-link will be indicated, e.g., to a higher level protocol and the IP-link will remain inoperative, block 61, until appropriate measures have been taken to reinstate at least one operative ATM-connection, e.g. waiting a certain amount of time or informing the network operator. However, these measures are not within the scope of the present invention.

By help of the present invention, an IP-subnetwork appears to be operative to the IP-level as long as there is at least one operative ATM-connection through said IP-subnetwork. However, if there is no operative ATM-connection the IP-subnetwork itself has become inoperative, which implies a change in network topology that will be detected by the IP-level after a certain delay time and will then cause changes in the routing tables of the IP-nodes. This could be done more efficiently by means 476 for indicating, e.g. to a higher level protocol, the status of each of the ATM-connections that belong to an IP-subnetworks. One possibility is to send such an indication only in case that the IP-subnetwork has become inoperative. Another possibility is that the IP-over-ATM link function periodically sends an indication on whether its assigned IP-subnetwork is operative or not.

The monitoring means 475 can preferably be applied to monitor the operability of all ATM-connections in an IP-subnetwork instead of only monitoring the operability of those ATM-connections that have been selected for transmission of IP-packets. This implies two advantages: When said ATM-connections can be monitored over a longer time period it is possible to detect ATM-connections that are frequently affected by failures. The reliability of an IP-subnetwork could then be improved by a restriction to select such ATM-connections as long as there are other ATM-connections available. Another advantage relates to the fact that IP-traffic is rather unpredictable by nature, i.e. IP-packets can be sent either in large bursts, e.g. when applying the File Transfer Protocol, or only in smaller portions at certain times, e.g. for performance measurements. If the operability of all ATM-connections is constantly monitored, the selection and assignment of ATM-connections in an IP-subnetwork can be done in a more efficient way by preferably applying a specific default ATM-connection as long as this preferred ATM-connection is operative.

The description above refers to the use of the present invention in an UMTS Radio Access Network as one possible example. However, it should be understood that the invention in general terms could be applied also for other types of networks. Thus, the network structure as described in FIG. 3 is an illustrative example and by no means restrictive for the usage of the present invention. Generally, the only necessary precondition is a plurality of nodes that are interconnected by means of an appropriate physical transmission medium. The description furthermore refers to IP and ATM as two possible examples of protocols that are used in said communication network. Generally, it is sufficient to presume a first communication protocol, e.g. IP, that provides the ability for an end-to-end data transmission between two arbitrary nodes in the communication network. This could be a connectionless protocol but also a connection-oriented protocol. There is neither any restriction whether said protocol is packet-switched or circuit-switched. Instead of ATM, it is likewise sufficient to presume more generally a second communication protocol that provides the ability for data transmission via an assigned communication channel forming a point-to-point connection between two nodes in the communication network.

What is claimed is:

1. Arrangement (47) in a node (40) of a communication network (30), said node (40) applying a first communication protocol for data transfer on links between nodes in said network and applying a second communication protocol for data transfer on point-to-point connections in said network having a single access point (471) for at least one link, at least two assigned point-to-point connections (472) to other network nodes supporting said second communication protocol, means (473) for selecting an appropriate and operative one of said assigned point-to-point connections (472), means (474) for monitoring the operability of assigned point-to-point connections (472), means (475) for initiating a reselection of a redundant point-to-point connection (472) in order to replace a point-to-point connection that has been detected to be inoperative.

2. Arrangement according to claim 1, having a means (473) for preferably selecting a default point-to-point connection as long as this connection is monitored to be operative.

3. Arrangement according to claim 1, having a means (475) for indicating a restriction for the selection of a certain point-to-point connection.

4. Arrangement according to claim 1, having a means (475) for indicating operative changes of a link.

5. Arrangement according to claim 1, having a means (475) for periodically indicating the status of a link.

6. Arrangement according to claim 1, wherein said first communication protocol is a TCP/IP protocol and said second communication protocol is an ATM protocol.

7. Communication network consisting of a plurality of interconnected nodes whereof a first plurality of said nodes apply a first communication protocol for data transfer on links between nodes in said network and a second plurality of said nodes apply a second communication protocol for data transfer on point-to-point connections in said network, whereof at least two of said nodes apply both communication protocols, and wherein at least two nodes include the arrangement according to claim 1.

8. Method for data transmission according to a first communication protocol in at least two nodes (31, 32) of a communication network (30) consisting of a plurality of interconnected nodes, said nodes applying in said network a first communication protocol for data transfer on links between nodes and a second communication protocol for data transfer on point-to-point connections, assigning at least two point-to-point connections as part of a link for data transmission, selecting (63) an appropriate and operative one of said assigned point-to-point connections, monitoring (65) the operability of assigned point-to-point connections, reselecting (63) a redundant point-to-point connection in order to replace a point-to-point connection that has been detected to be inoperative (66).

9. Method according to claim 8, selecting (62) a default point-to-point connection as long as this connection is monitored to be operative.

10. Method according to claim 8, indicating a restriction for assignment of certain point-to-point connections.

11. Method according to claim 8, indicating (64) operative changes of a link.

12. Method according to claim 8, indicating (64) the status of a link at periodical times.

13. Method in a communication network, said network consisting of a plurality of interconnected nodes whereof a first plurality of said nodes apply a first communication protocol for data transfer on links between nodes in said network and a second plurality of said nodes apply a second communication protocol for data transfer on point-to-point connections in said network, whereof at least two of said nodes apply both communication protocols, having at least two nodes performing the method according to claim 8.

* * * * *